United States Patent [19]

Smith

[11] Patent Number: 4,890,803
[45] Date of Patent: Jan. 2, 1990

[54] AIRFOIL WITH FIXED AND VARIABLE UPPER CAMBER PORTIONS

[76] Inventor: Larry L. Smith, 5 Court St., Canfield, Ohio 44406

[21] Appl. No.: 78,975

[22] Filed: Jul. 29, 1987

[51] Int. Cl.$^4$ ............................................. B64C 3/48
[52] U.S. Cl. ................................. 244/219; 244/201
[58] Field of Search .................. 244/35 R, 199, 200, 244/215, 218, 219

[56] References Cited

U.S. PATENT DOCUMENTS

| | | | |
|---|---|---|---|
| 1,194,878 | 8/1916 | Roessler | 244/219 |
| 1,918,897 | 7/1933 | Colburn | 244/219 |
| 4,606,519 | 8/1986 | Fertis | 244/200 |

FOREIGN PATENT DOCUMENTS

| | | | |
|---|---|---|---|
| 2361210 | 6/1975 | Fed. Rep. of Germany | 244/219 |
| 192568 | 2/1923 | United Kingdom | 244/200 |

Primary Examiner—Sherman D. Basinger
Assistant Examiner—Rodney Corl
Attorney, Agent, or Firm—Harpman & Harpman

[57] ABSTRACT

An airfoil having improved aerodynamic characteristics has a leading edge and a trailing edge longitudinally spaced therefrom. A continuous lower surface of the air foil forms a lower camber extending from the leading edge to the trailing edge. The upper surface of the air foil has a first fixed upper surface extending rearwardly from the leading edge and terminating in an offset and a second upper surface extends rearwardly therefrom and is movable from a first position defining a first upper camber portion of the airfoil to a second position defining a second upper camber portion thereof.

8 Claims, 1 Drawing Sheet

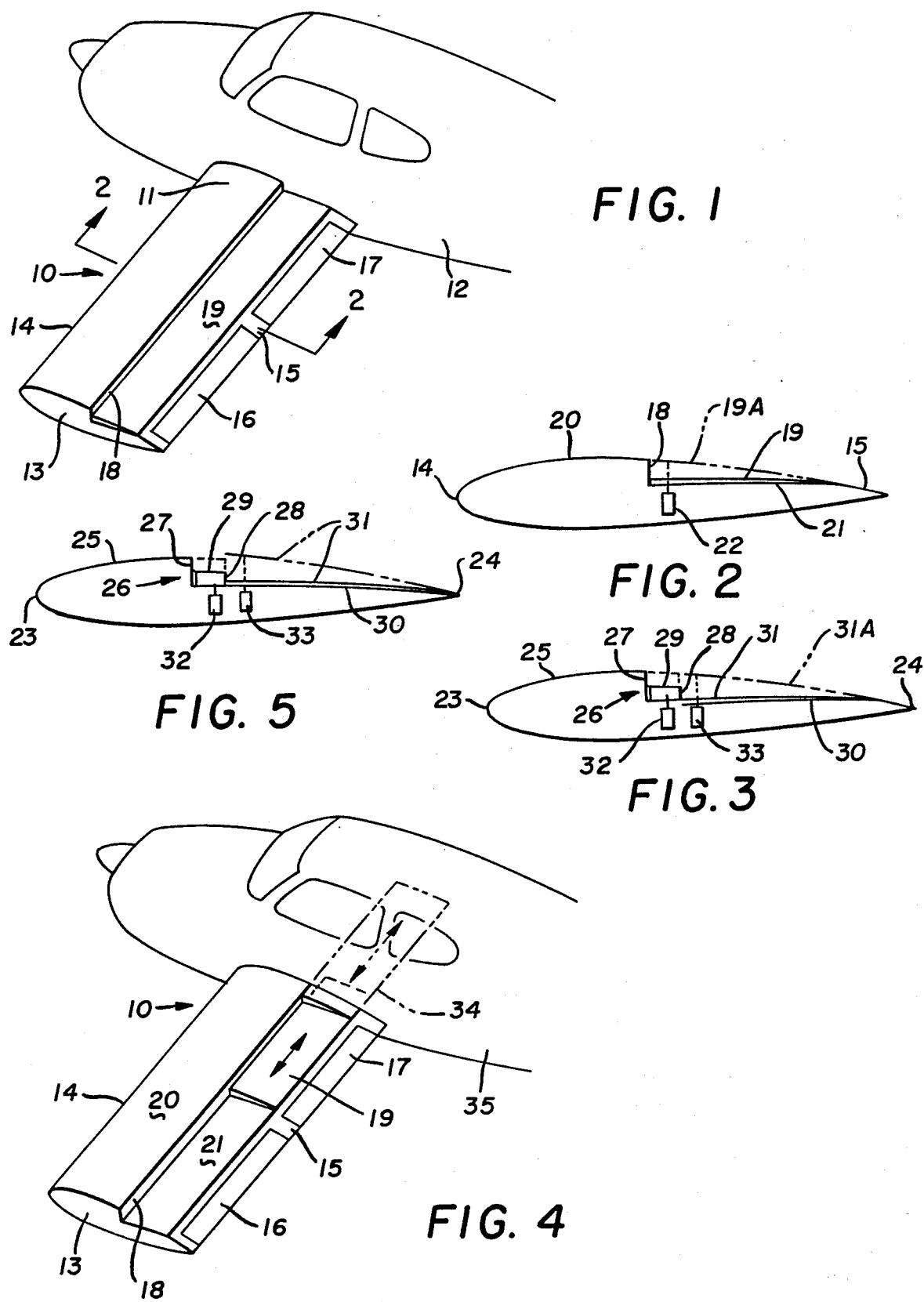

AIRFOIL WITH FIXED AND VARIABLE UPPER CAMBER PORTIONS

BACKGROUND OF THE INVENTION

1. Technical Field

This invention relates to an airfoil having improved lift coefficients at operational angles of attack and more specifically the present invention relates to an airfoil having upper camber portions that may be positioned to form a single upper camber portion or several upper camber portions.

2. Description of the Prior Art

The primary concern with any airfoil design is twofold; first to produce a greater amount of lift without adversely increasing drag and second to enable the airfol to function at greater angles of attack without stalling. With respect to the wing of an airplane for example, a design suitable for producing substantial lift at low air speeds inherently produces excessive drag at high air speeds and on the other hand a wing designed to fly with minimal drag at high air speeds generally fails to produce sufficient lift at low air speeds to maintain flight as during take-offs and landings. This latter condition results in the stalling of the wing as the angle of attack of the wing is increased in an effort to produce greater lift until the critical angle of attack is exceeded. It is understood that an airfoil will stall at any air speed whenever the angle of attack of the airfoil to the free stream air flow exceeds a critical angle of attack for the particular air foil. The prior art includes movable slots and/or flaps on the lead and trailing edges of the wing which change the cross sectional profile of the wing. The slots and/or flaps may be adjusted during flight for optimum performance of the wing at various flight conditions. At high air speeds the slots and/or flaps are fully retracted to give the wing a relatively thin streamlined profile reducing the drag acting thereon. At lower air speeds the slots and/or flaps are extended downward to produce a greater camber on the wing which permits the wing to develop greater lift along with greater drag. The use of slots and/or flaps thus increase the aircraft's operational angles of attack through which the aircraft can safely operate, but because of the increase in drag the extension of the slots and/or flaps is only advisable at relatively low air speeds and thus they are unable to improve the lift and stall characteristics of the wing at high cruising air speeds.

The present invention provides an airfoil with means of altering the upper surfaces thereof so as to optionally form a relatively thin streamlined profile having a single continuously extending upper surface forming a positive upper camber portion and alternately forming a first upper surface extending rearwardly from the leading edge defining a positive upper camber portion and a second upper surface rearwardly of said first upper surface and defining a second variable upper camber portion.

DESCRIPTION OF THE DRAWINGS

FIG. 1 is a partial perspective view of an airfoil embodying the concept of the present invention shown in relation to the fuselage of a fixed-wing aircraft;

FIG. 2 is a cross section of the airfoil taken on line 2—2 of FIG. 1 and showing a portion of the airfoil in a first position;

FIG. 3 is a cross section of an airfoil with a step configuration and showing a portion of the airfoil in a second position;

FIG. 4 is a partial perspective view of an airfoil, a portion thereof being movable into and out of a cavity in the fuselage of a fixed-wind aircraft.

FIG. 5 is a cross section of an airfoil with a step configuration and showing another portion thereof in a second position.

SUMMARY OF THE INVENTION

An airfoil according to the concept of the present invention is disclosed as an elongated wing member of a fixed wing aircraft and has a leading edge and a trailing edge. A laterally extending offset is formed in the upper surface of the airfoil so as to form first and second upper surfaces, the first upper surface defining a generally positive upper camber portion and the second upper surface defining a generally negative upper camber portion. A movable flap extends coextensively with the second upper surface and is movable from an uppermost position where it forms a continuation of the first upper surface defining a generally positive upper camber portion of the airfoil to a lowermost position where it forms a generally negative upper camber portion.

DESCRIPTION OF THE PREFERRED EMBODIMENT

An airfoil according to the present invention is indicated generally by the numeral 10 in FIG. 1 illustrated as a wing member of a fixed-wing aircraft. As a wing member, the airfoil generally includes a root section 11 by which it is secured to the fuselage 12 of the aircraft and a wing tip 13 defining the outer end of the wing member. A leading edge 14 and a longitudinally displaced trailing edge 15 extend between the root section 11 and the wing tip 13 and together define the planform of the airfoil 10.

Control surfaces such as an aileron 16 and flap 17 may likewise be incorporated in the airfoil 10. A longitudinally extending offset 18 defined by a vertical surface is formed in the upper surface of the airfoil 10 and as illustrated it extends from the fuselage 12 to the wing tip 13 and it will be appreciated that it need not extend completely therebetween. The airfoil incorporating the laterally extending offset 18 is described in U.S. Pat. No. 4,606,519 issued Aug. 19, 1986 to the present applicant and another and the present invention comprises an improvement with respect thereto in that the airfoil of said patent disclosed first and second fixed upper surfaces of the airfoil separated by an offset forwardly of the trailing edge of the airfoil so as to be positioned on different vertical elevations whereas the airfoil of the present invention, see FIG. 2, has a leading edge 14 and a first fixed upper surface 20 extending between the lading edge 14 and the offset 18 and a second upper surface 21 extending between the offset 18 and the trailing edge 15 of the airfoil. A member or flap 19 extends between the offset 18 and the trailing edge 15 and is hingedly affixed to the airfoil at or adjacent the trailing edge 15, the member or flap 19 being movable in an arc based on the point of attachment thereof with the trailing edge 15 of the airfoil. The airfoil is provided with means 22 which may be mechanical, hydraulic, or pneumatically actuated for moving the member or flap 19 vertically so that it may be positioned in a first upper position as shown in broken lines and the reference numeral 19A where it forms a continuous extension of the first upper surface 20 of the airfoil as it extends therefrom to the trailing edge 15 and as the member or flap 19 may be bowed transversely, it may be bowed by mechanical, hydraulic or pneumatically actuated means to form an extension of the first fixed upper surface of the airfoil to comprise a generally positive or generally negative upper camber portion or it may be pre-bowed.

Alternately, and still referring to FIG. 2 of the drawings, it may be lowered by the means 22 to the position on the solid line 19 where if it is planar it will form a generally negative upper camber portion of the airfoil. Alternately, it may be positioned at various locations between said upper and lower positions.

By referring to FIG. 3 of the drawings, a cross section of an airfoil similar to that of FIG. 2 may be seen and wherein a leading edge 23 and a trailing edge 24 define the width of the airfoil and a first upper section 25 extending rearwardly from the leading edge 23 forms a positive upper camber portion terminating at an offset stepped configuration 26 running longitudinally of the airfoil and incorporating a first vertical surface 27 and a second horizontally spaced vertical surface 28 connected by a transversely arched substantially horizontally disposed section 29. The second vertical surface 28 is located at the forward edge of a second upper surface 30 which if bowed upwardly forms a second positive upper camber portion and if planar or bowed downwardly intermediate it edges, forms a negative upper camber portion. As illustrated in FIG. 3 a member or flap 31 is hingedly affixed to the airfoil adjacent the trailing edge 24 thereof and extends forwardly thereof and is movable from a lowermost portion adjacent the second upper surface 30 to an uppermost position shown in broken lines 31A where it forms a continuation of the first upper section 25 of the airfoil. In FIG. 5 of the drawings the member or flap 31 is hingedly affixed to the airfoil at the trailing edge 24 thereof and the horizontally disposed section 29 forms the middle step in a stepped configuration defined by the first vertical surface 27 and the second vertical surface 28. The forward edge of the member or flap 31 may be retractable. A vertically movable body may form the offset step 26 which is movable from the position shown in solid lines in FIG. 3 to the upper broken line 31A by mechanical, hydraulic, or pneumatically actuated means 32. The member or flap 31 may be moved by means 33 which may be mechanical, hydraulic, or pneumatically actuated. The member or flap 32 in uppermost position extends the first upper surface 25 forming a positive upper camber portion, the offset step 26 with the arched middle portion thereof forming a second positive camber portion, and the second upper surface 30 if bowed upwardly forming a third positive upper camber portion or if planar or bowed downwardly intermediate its edges forming a negative upper camber portion.

Those skilled in the art will observe that by changing the relative position of the member or flap 19 of the airfoil illustrated in FIGS. 1 and 2 of the drawings or the member or flap 30 as illustrated in FIG. 3 of the drawings, the lift and the angle of attack at which the lift is most efficient may be varied at will by the operator to control the lift at a predetermined angle of attack and/or speed of the airfoil with respect to the airflow thereover.

Those skilled in the art will observe that it is possible to move the member or flap 19 of the embodiment of FIGS. 1 and 2 of the disclosure or the member of flap 31 of the embodiment of FIG. 3 of the disclosure longitudinally of the airfoil, as for example in a fixed-wing aircraft the member or flaps may be moved toward and into receptive chambers 34 formed in the lower portion of the fuselage 35 of the aircraft and it will be seen that in such event the effective area of the members or flaps concerned may be additionally varied with respect to the upper surfaces of the airfoil enabling a further control of the aircraft with respect to the lift generated thereby by the positive and/or negative upper camber portions of the airfoil.

It will thus be seen that the improvement in airfoils as herein disclosed incorporates a substantial improvement in the aerodynamic characteristics thereof occasioned by the discontinuity generated by the offset in the upper surface of the airfoil and additionally and most importantly the ability of the structure of the present invention to directly control the degree of aerodynamic improvement and/or lift or unobstructed airflow with respect to such an airfoil through the use of the movable members or flaps positioned in the airfoil immediately rearwardly of the offset formed therein.

Although but two embodiments of the present invention have been illustrated and described, it will be apparent to those skilled in the art that various changes and modifications may be made therein without departing from the spirit of the invention and having thus described my invention what I claim is:

I claim:

1. An airfoil comprising a leading edge; a trailing edge located longitudinally rearward of said leading edge; a continuous lower surface extending from said leading edge to said trailing edge, said lower surface defining a lower camber; a first fixed upper surface extending rearwardly from said leading edge and terminating in at least one continuous vertical surface defining an offset forwardly of said trailing edge, said first fixed upper surface defining a first positive upper camber portion; a second fixed upper surface extending rearwardly from said continuous vertical surface of said offset and defining a second upper camber portion, a planar member positioned on and coextensive with said second fixed upper surface, means attaching a rearward edge of said planar member to said airfoil inwardly of said trailing edge and means for moving said planar member from a first position in substantial alignment with said first fixed upper surface to form an extension of said first positive upper camber portion to second positions on and above said second fixed upper surface.

2. An airfoil according to claim 1 in which said second fixed upper surface has a forward end elevationally displaced from said first fixed upper surface and wherein said planar member has a rearward edge movably attached to said airfoil inwardly of said trailing edge.

3. An airfoil according to claim 2 in which said continuous vertical surface extends from said first fixed upper surface to said second fixed upper surface and in which said planar member has a forward edge movably positioned immediately adjacent said continuous vertical surface.

4. An airfoil according to claim 1 in which said second fixed upper surface and said planar member extend rearwardly toward said trailing edge.

5. An airfoil according to claim 1 in which said planar member has a rearward edge registering with said second fixed upper surface adjacent said trailing edge and wherein said planar member is movable toward and away from said second fixed upper surface.

6. An airfoil according to claim 1 in which means for bowing said planar member transversely is positioned in said airfoil whereby said member may be shaped to form an upper positive camber portion and an upper negative camber portion of said airfoil 7. An airfoil comprising a leading edge; a trailing edge located longitudinally rearward of said leading edge; a continuous lower surface extending from said leading edge to said trailing edge, said lower surface defining a lower camber; a first upper surface extending rearwardly from said leading edge and terminating in a stepped offset forwardly of said trailing edge, at least two vertical surfaces and one horizontal surface defining said stepped offset, said first upper surface defining a positive upper camber portion; a second upper surface extending rearwardly from one of said vertical surfaces of said stepped offset, said second upper surface defining a second upper camber portion; a planar member positioned on and coextensive with said second upper surface, means movably attaching a rearward end of said planar member to said airfoil inwardly of said trailing edge and means for moving said member in an arc based on said attachment means, said member being movable from a first position adjacent said second upper surface to a second position forming an extension of said first upper surface, said member defining a positive upper camber portion in said second position, a rectangular body movably positioned in said airfoil adjacent one of said vertical surfaces and defining the other one of said vertical surfaces and said horizontal surface.

8. An airfoil according to claim 7 in which said body movably positioned in said airfoil forms said stepped offset and means for moving said body from a first position below said first upper surface to a second position above said second upper surface.

* * * * *